(12) United States Patent
Donolo (10) Patent No.: US 8,554,385 B2
(45) Date of Patent: Oct. 8, 2013

(54) SYSTEMS AND METHODS FOR MONITORING AND CONTROLLING ELECTRICAL SYSTEM STABILITY

(75) Inventor: Marcos A. Donolo, Pullman, WA (US)

(73) Assignee: Schweitzer Engineering Laboratories Inc., Pullman, WA (US)

( * ) Notice: Subject to any disclaimer, the term of this patent is extended or adjusted under 35 U.S.C. 154(b) by 350 days.

(21) Appl. No.: 12/879,074

(22) Filed: Sep. 10, 2010

(65) Prior Publication Data

US 2011/0066301 A1 Mar. 17, 2011

Related U.S. Application Data

(60) Provisional application No. 61/241,734, filed on Sep. 11, 2009.

(51) Int. Cl.
*G05D 11/00* (2006.01)

(52) U.S. Cl.
USPC ................................. 700/292; 702/57; 290/44

(58) Field of Classification Search
USPC ............................. 700/292; 702/57; 290/44
See application file for complete search history.

(56) References Cited

U.S. PATENT DOCUMENTS

| | | | |
|---|---|---|---|
| 5,731,943 A | 3/1998 | Roberts | |
| 6,212,446 B1 | 4/2001 | Sato | |
| 6,476,521 B1 | 11/2002 | Lof | |
| 6,518,767 B1 | 2/2003 | Roberts | |
| 6,603,298 B2 | 8/2003 | Guzman-Casillas | |
| 6,662,124 B2 | 12/2003 | Schweitzer | |
| 6,690,175 B2 | 2/2004 | Pinzon | |
| 6,745,175 B2 | 6/2004 | Pierce | |
| 6,751,653 B2 | 6/2004 | Austin | |
| 6,754,597 B2 | 6/2004 | Bertsch | |
| 6,833,711 B1 | 12/2004 | Hou | |
| 6,845,333 B2 | 1/2005 | Anderson | |
| 6,934,654 B2 | 8/2005 | Benmouyal | |
| 6,944,555 B2 | 9/2005 | Blackett | |
| 6,983,393 B2 | 1/2006 | Truchard | |
| 7,006,935 B2 | 2/2006 | Seki | |
| 7,096,175 B2 | 8/2006 | Rehtanz | |
| 7,107,162 B2 | 9/2006 | Zima | |
| 7,248,977 B2 | 7/2007 | Hart | |
| 7,630,863 B2 | 12/2009 | Zweigle | |

(Continued)

OTHER PUBLICATIONS

Yanfeng Gong, Noel Schultz, Armando Guzman, Synchrophasor-Based Real-Time Voltage Stability Index, Sep. 22, 2005.

(Continued)

*Primary Examiner* — Mohammad Ali
*Assistant Examiner* — Anthony Whittington
(74) *Attorney, Agent, or Firm* — Jared L. Cherry (57) ABSTRACT

Disclosed herein are systems and methods for monitoring and controlling an electric power delivery system to mitigate against voltage instability. According to various embodiments, one or more stability thresholds may be compared to one or more stability estimates. Stability estimates may be generated based on electrical conditions in an electric power delivery system. Upon the occurrence of the contingency, one or more control actions specified by a contingency index may be executed in order to mitigate against voltage instability. A plurality of stability estimates may be generated, each of which may be compared to a respective stability threshold. According to various embodiments, stability estimates and stability thresholds may be based on a reactive power to voltage margin, an incremental reactive power cost, an incremental load cost, and a power import margin.

22 Claims, 10 Drawing Sheets

(56) References Cited

U.S. PATENT DOCUMENTS

| | | |
|---|---|---|
| 2003/0200038 A1 | 10/2003 | Schweitzer |
| 2004/0093177 A1 | 5/2004 | Schweitzer |
| 2006/0029105 A1 | 2/2006 | Kasztenny |
| 2006/0067095 A1 | 3/2006 | Hou |
| 2006/0152866 A1 | 7/2006 | Benmouyal |
| 2006/0224336 A1* | 10/2006 | Petras et al. ............ 702/62 |
| 2006/0259255 A1* | 11/2006 | Anderson et al. ........ 702/64 |
| 2007/0086134 A1 | 4/2007 | Zweigle |
| 2007/0216164 A1* | 9/2007 | Rivas et al. ............ 290/44 |
| 2008/0077336 A1* | 3/2008 | Fernandes ............ 702/57 |
| 2009/0085407 A1 | 4/2009 | Venkatasubramanian |
| 2009/0088989 A1 | 4/2009 | Guzman-Casillas |
| 2009/0088990 A1 | 4/2009 | Schweitzer |
| 2009/0089608 A1* | 4/2009 | Guzman-Casillas ........ 713/340 |
| 2009/0099798 A1* | 4/2009 | Gong et al. ............ 702/57 |
| 2009/0125158 A1 | 5/2009 | Schweitzer |
| 2009/0278351 A1* | 11/2009 | Rivas et al. ............ 290/44 |
| 2010/0002348 A1 | 1/2010 | Donolo |

OTHER PUBLICATIONS

Edmund O. Schweitzer, Timothy T. Newton, Richard A. Baker, Power Swing Relay Also Records Disturbances, 13th Annual Western Protective Relay Conference, Oct. 21, 1986.

ABB: Improved Power System Performance through Wide Area Monitoring, Protection, and Control, 2004.

ABB, Wide Area Measurement, Monitoring, Protection and Control, Industrial IT for Energy System Operation, 2003.

Demitrios A. Tziouvaras, Daqing Hou, Out-of-Step Protection Fundamentals and Advancements, 2003.

Y. Wu, M. Kezunovic, Automatic Simulation of IED Measurements for Substation Data Integration Studies, Power Engineering Society General Meeting, Jun. 12-16, 2005.

M. Kezunovic, G. Latisko, Automated Monitoring Functions for Improved Power System Operation and Control, Power Engineering Society General Meeting, Jun. 12-16, 2005.

A.P. Sakis Meliopoulos, George J. Cokkinides, Floyd Galvan, Bruce Fardanesh, Georgia Institute of Technology, Entergy Services, Inc and New York , Distributed State Estimator-Advances and Demonstration, 2008.

Saman A. Zonouz and William H. Sanders, Information Trust Institute, Coordinated Science Laboratory, and Electrical and Computer Engineering Department , A Kalman-based Coordination for Hierarchical State Estimation: Algorithm and Analysis, 2008.

Cold Load Pickup Issues, A Report to the Line Protection Subcommittee of the Power System Relay Committee of the IEEE Power Engineering Society, May 16, 2008.

SEL-3378 Synchrophasor Vector Processor Instruction Manual, Apr. 4, 2008.

* cited by examiner

SYSTEMS AND METHODS FOR MONITORING AND CONTROLLING ELECTRICAL SYSTEM STABILITY

RELATED APPLICATION

The present application claims the benefit under 35 U.S.C. §119(e) of U.S. Provisional Patent Application No. 61/241,734, filed Sep. 11, 2009, titled "ELECTRICAL SYSTEM INTEGRITY PROTECTION," which application is incorporated herein by reference in its entirety.

TECHNICAL FIELD

This disclosure relates to systems and methods for monitoring and controlling an electric power delivery system. This disclosure further relates to systems and methods for mitigating against electric power delivery system voltage instability.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Disclosed herein are systems and methods for monitoring and controlling electric power delivery systems in order to mitigate against voltage instability. The systems and methods disclosed herein may be utilized to maintain an electric power delivery system within specified parameters. According to various embodiments, one or more stability estimates may be compared against one or more stability thresholds. The stability estimate may be derived from analysis of electrical conditions in an electric power delivery system. Once a stability threshold has been reached, the system may initiate one or more control actions upon the detection of one or more specified criteria in order to mitigate against voltage instability in the electric power delivery system. A plurality of stability estimates may be maintained, each of which may be derived from analysis of electrical conditions in the electric power delivery system. According to various embodiments, stability estimates, such as a reactive power to voltage margin, an incremental reactive power cost, an incremental load cost, and a power import margin may be compared to specified stability thresholds in order to determine whether an electric power delivery system is operating within acceptable parameters.

Once a stability threshold has been reached, the system may await the occurrence of a contingency specified in a contingency index before undertaking control actions to mitigate against voltage instability. In various embodiments, a plurality of contingencies may be monitored, and each contingency may be associated with a plurality of control actions. A contingency index may correlate various contingencies with a particular set of control actions. For example, in a system where a reactive power to voltage margin satisfies a specified stability threshold, and upon the occurrence of a specified contingency, a particular set of control actions may be executed. The contingency index may comprise information regarding various loads connected to the electric power delivery system. The information comprised in the contingency index regarding various loads may be utilized in determining which load(s) should be disconnected in the event of certain contingencies in order to avoid disruption of the electric power delivery system. For example, a contingency index may identify certain loads having a large inductive component. Disconnecting a load having a large inductive component may allow for a reduction of the reactive power to voltage margin with minimal impact to other customers connected to the electric power delivery system.

According to various embodiments, the systems and methods disclosed herein may be utilized in a real-time system, or in an approximately real-time system. As the term is used herein, a "real-time" system is any system that completes a specified operation on or before a specified deadline or schedule. For example, a system that receives an input and generates an output based on the input in one second may be referred to as a "real-time" system.

Various embodiments may include a simulation subsystem that is configured to simulate a plurality of scenarios that may occur in the electric power delivery system. The results of such simulations may be used to generate stability estimates. In various embodiments, data gathered from the electric power delivery system may be analyzed by the simulation subsystem using a power flow engine in order to predict a response of the electric power delivery system to existing conditions.

Voltage instability may play a significant role in major electric power delivery system events. Two examples of such events due to voltage instability include the blackout of Jul. 2, 1996 in the western United States and the blackout of Aug. 14, 2003 in the northeastern United States. Voltage instability was encountered in these two blackouts because reactive power supplies (e.g., generator reactive power outputs, shunt capacitor devices) were exhausted ahead of the blackouts. Accordingly, specific embodiments of the systems and methods disclosed herein may be applied to mitigate against voltage instability. Such embodiments may calculate the amount of inductive load at a particular bus that would cause voltage instability, and in the event of a certain contingency, activate a system that systematically sheds loads in an attempt to mitigate against voltage instability.

As the term is used herein, "voltage instability" refers to a state of an electric power delivery system wherein the load demand is beyond the maximum power limit (active power and reactive power) that can be generated and transferred from the source to a load connected to the electric power delivery system. An electric power delivery system at a given operating state and subject to a given disturbance undergoes "voltage collapse" if post-disturbance equilibrium voltages are below acceptable limits.

As the term is used herein, an Intelligent Electronic Device ("IED") refers to any microprocessor-based device that monitors, controls, automates, and/or protects monitored equipment within an electric power delivery system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs gather status information from one or more pieces of monitored equipment. IEDs may receive information concerning monitored equipment using sensors, transducers, actuators, and the like. IEDs may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. IEDs may also be configured to communicate calculations, such as phasors (which may or may not be synchronized as synchrophasors), events, fault distances, differentials, impedances, reactances, frequency, and the like. IEDs may also communicate settings information, IED identification information, communications information, status information, alarm information, and the like.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

Several aspects of the embodiments described will be illustrated as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment, where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product, including a machine-readable storage medium having stored thereon instructions that may be used to program a computer (or other electronic device) to perform processes described herein. The machine-readable storage medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Figure 1:
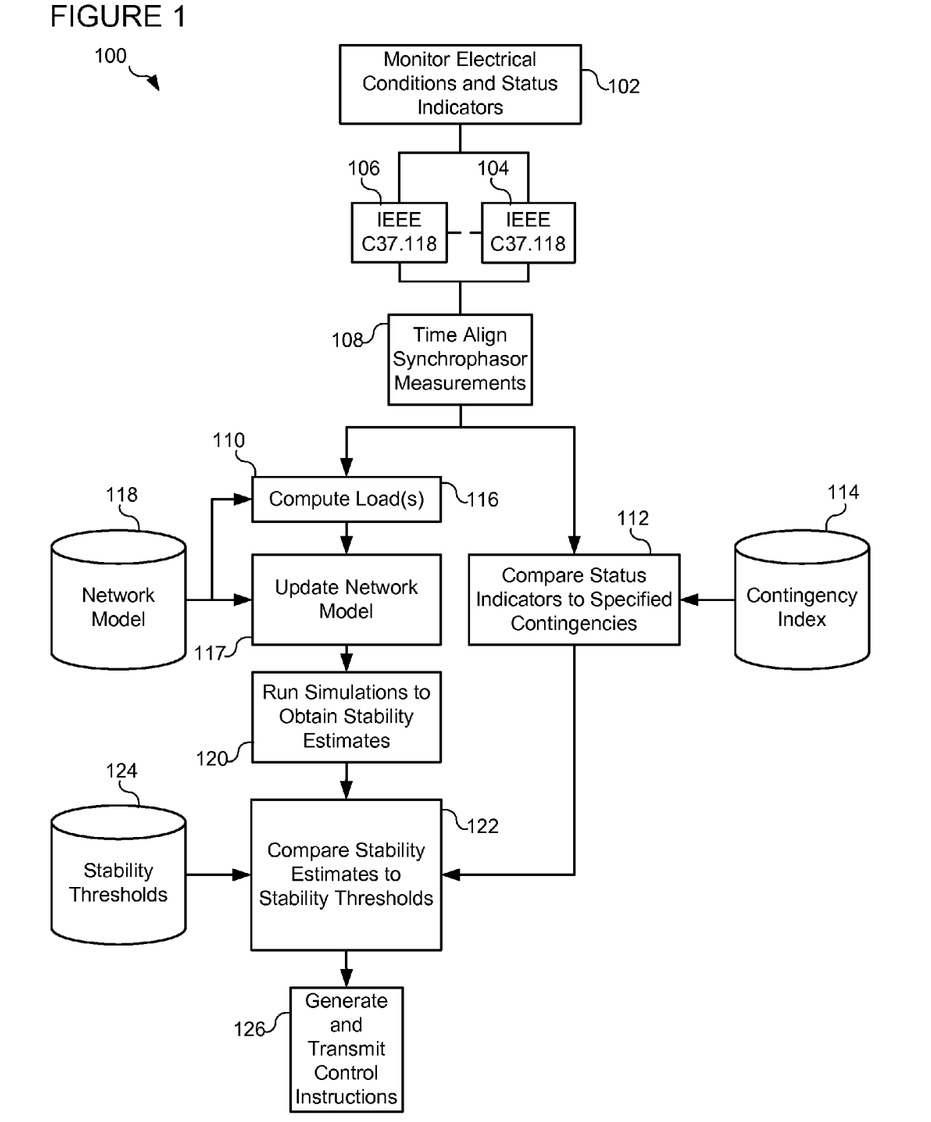
FIG. 1 illustrates a functional block diagram of a system for monitoring and controlling an electric power delivery system.

FIG. 1 illustrates a functional block diagram of one embodiment of a system 100 for monitoring and controlling an electric power delivery system (not shown). System 100 may monitor electrical conditions and status indicators in the electric power delivery system. Electrical conditions to be monitored in the electric power delivery system may include voltages, currents, reactive power, power, phase angles, etc. Status indicators to be monitored in the electric power delivery system may include switch status, circuit breaker status, tap status, meter readings, etc.

The plurality of measurements representing electrical conditions and status indicators may be formatted as a plurality of data streams 104 and 106 in the IEEE C37.118 format. Synchrophasor measurements may be time aligned 108 to produce time-aligned data sets for analysis. The time-aligned synchrophasor measurements may be used to compute loads 110 using a network model 118. Network model 118 may allow for the calculation of the loads connected to each of a plurality of buses in the electric power delivery system based on the time aligned synchrophasor measurements. In one embodiment, the network model may comprise a static load model. The computed loads may be used to update the network model 117 from a network model 118 that may be stored in a database. The updated network model may be used to run simulations to obtain stability estimates 120. The simulations may be formulated to determine stability estimates for various locations (such as buses) in the electric power delivery system. The stability estimates may include stability estimates for a plurality of nodes in an electric power distribution system and for each of a plurality of contingencies. The simulations using the network model 118 may solve power flow problems under a wide variety of conditions in order to define stability thresholds that delineate the boundaries of stability in an electric power delivery system. The solution to these power flow problems may be affected by changes in the configuration of the electric power delivery system.

A variety of types of stability estimates may be generated, according to various embodiments. For a given electric power delivery system operating under steady-state power flow conditions, a reactive power to voltage ("QV") margin at a bus is defined by Eq. 1. As expressed in Eq. 1, the $QV_{Margin}$ is the minimum addition of inductive load to the reactive power base, $Q_{Base}$, at the bus that causes voltage instability, $Q_{Instability}$.

$$QV_{Margin} = Q_{Instability} - Q_{Base} \quad \text{Eq. 1}$$

One procedure to obtain the $QV_{Margin}$ at a bus involves solving simulated power flow problems for an increasing inductive load at the bus until no power flow solution can be found. Another method for calculating a $QV_{Margin}$ is described in United States Patent Application Publication Number 2009/0085407 titled "Method and Device for Assessing and Monitoring Voltage Security in a Power System," which is incorporated by reference herein.

According to another embodiment, stability estimates may comprise estimates associated with an incremental reactive power cost ("IRPC") for a plurality of buses. The IRPC for a given bus may be calculated using Eq. 2.

$$IRPC_j = \sum_{k=1}^{n} \frac{\Delta Q_{gen_k}}{\Delta Q_{bus_j}} \quad \text{Eq. 2}$$

In Eq. 2, $\Delta Q_{gen_k}$ is the change in the $k^{th}$ generator reactive power output for a small change in the reactive power load at the bus, $\Delta Q_{bus_j}$, and n is the number of reactive power sources. $IRPC_j$ may be calculated by solving a power flow problem, simulating the addition of an incremental amount of reactive power at $bus_j$, solving another power flow problem, and then computing the differential quantities in $IRPC_j$ ratio. When $IRPC_j$ equals 1, consuming one extra MVAR at the bus will require generating one extra MVAR at the reactive power sources. Tolerable thresholds are determined on a case-by-case basis, depending on the electric power delivery system.

Stability estimates may also comprise estimates associated with an incremental load cost ("ILC") and load-shedding bus selection, according to some embodiments. ILC may be interpreted to indicate how much reactive power may be provided to feed each unit of complex power at the $bus_j$. The ILC of a bus for a given loading condition is calculated using Eq. 3.

$$ILC_j = \sum_{k=1}^{n} \frac{\Delta Q_{gen_k}}{\Delta S_{bus_j}} \quad \text{Eq. 3}$$

In Eq. 3, $\Delta S_{bus_j}$ is a small change in the total load at $bus_j$.

A power import margin ("PIM") is another type of stability estimate of an electric power delivery system for which thresholds may be established. The PIM of an area in an electric power delivery system is the maximum amount of load that can be added in the area that does not result in system voltage instability.

System 100 may compare data from the electric power delivery system (such as status indicators) with specified contingencies 112 from a contingency index 114, to determine if a contingency has occurred. System 100 may monitor status indicators to determine whether any of a wide variety of contingencies have occurred. Examples of contingencies may include, but are not limited to, disconnection of a transmission line, loss of a generator, and connection of a load. Contingency index 114 may specify both a plurality of contingencies and one or more execution actions to be taken in response to each contingency. For example, if a $QV_{Margin}$ of a particular bus satisfies a stability threshold 124, and one or more contingencies specified by contingency index 114 is identified, a set of execution actions specified by contingency index 114 may be invoked in order to shed one or more loads having a large inductive component. Contingency index 114 may also include sets of execution actions that may be used in connection with stability thresholds 124 for incremental reactive power cost, incremental load cost and load-shedding, and power import margins.

The stability estimates are compared to stability thresholds 122 from a stability thresholds database 124. For example, stability thresholds 124 may comprise a minimum reactive power to voltage margin to be maintained at a bus. When the reactive power to voltage margin of the bus falls below the stability threshold, system 100 may be operating in nearly unstable conditions. Accordingly, the occurrence of one or more contingencies may cause voltage instability in the electric power delivery system. Together with the determination of an occurrence of a contingency, and a comparison of the stability estimate to a stability threshold, the system generates and transmits control instructions 126. Appropriate control instructions may be generated and transmitted 126 in response to the occurrence of the specified contingency.

Control instructions may be generated and transmitted 126 to various IEDs (not shown) distributed throughout the electric power delivery system.

Figure 2:
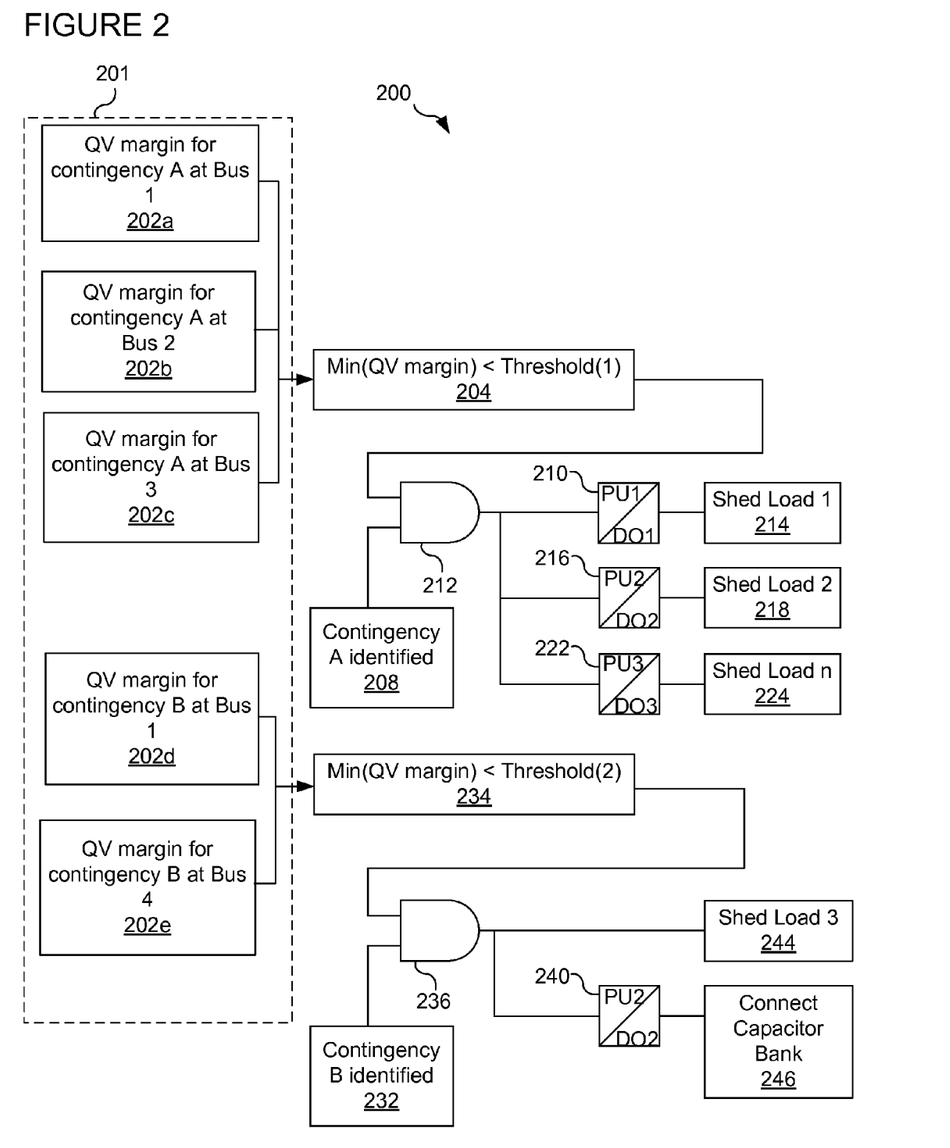
FIG. 2 illustrates one embodiment of a functional block diagram of a system that monitors a reactive power to voltage margin at a plurality of buses in an electric power delivery system and implements a plurality of control actions when the reactive power to voltage margin falls below a threshold and a specified contingency is identified.

FIG. 2 illustrates one embodiment of a functional block diagram of a system 200 that monitors a reactive power to voltage margin at a plurality of buses in an electric power delivery system and implements a plurality of control actions when the reactive power to voltage margin falls below a threshold and a specified contingency is identified. A plurality of stability estimates 201, each calculated for a particular contingency, may be generated based on electrical conditions in an electric power delivery system (not shown). In the illustrated embodiment, the stability estimates 201 comprise QV margins at buses 1, 2, 3, and 4. The minimum value of QV margins 202a-202c is compared to Threshold (1) 204. If the minimum QV margin of any of buses 1, 2, or 3 falls below Threshold (1) 204, a signal is provided to AND gate 212.

In parallel, system 200 monitors whether contingency A has occurred 208. Some possible contingencies that may lead to rapid voltage collapse include the disconnection of a transmission line, loss of a generator, connection of a load, or the like. If contingency A is identified 208, a signal is sent to AND gate 212. If AND gate 212 remains asserted for a specified time (or number of cycles) of timer 210, then a signal to shed load 1 214 is generated. The system may continue to calculate QV margins based on the electric power delivery system information provided thereto. If AND gate 212 remains asserted for a specified time (or number of cycles) of timer 216, a signal to shed load 2 218 is generated. Although the illustrated embodiment shows specific loads being shed based on the length of time that AND gate 212 is asserted, in alternative embodiments, different loads may be shed depending on the identified contingency. This process may continue for the shedding of multiple loads, including shedding of load n 224 when AND gate 212 remains asserted for a specified time (or number of cycles) of timer 222. Each of timer 210, 216, and 222 may also allow for a specification of a period of time that each timer will be asserted. The shedding of each of load 1, 2, and n may be referred to as execution actions.

QV margins 202d, and 202e may also be monitored in parallel and the minimum value of QV margins 202d, and 202e is compared to Threshold (2) 234. If the QV margin of either bus 1 or 4 falls below Threshold (2) 234, a signal is provided to AND gate 236. AND gate 236 also receives a signal when contingency B 232 is identified. If AND gate 236 is asserted, a signal is generated to immediately shed load 3 244. If AND gate 236 remains asserted for a specified time (or number of cycles) of timer 240, then a signal to connect capacitor bank 246 is generated. As indicated above, the particular control action may depend on the contingency identified.

In various embodiments, system 200 may be modified to include any number of stability estimates, which may be selectively compared to a variety of thresholds and contingencies. Further, various groupings of stability estimates may be compared to any number of stability thresholds and any number of contingencies. A wide variety of execution actions may be invoked upon the satisfaction of specified thresholds and the occurrence of specified contingencies. Such execution actions may include, but are not limited to, shedding one or more selected loads, increasing power generation, connecting a reactive power compensator, etc.

Figure 3:
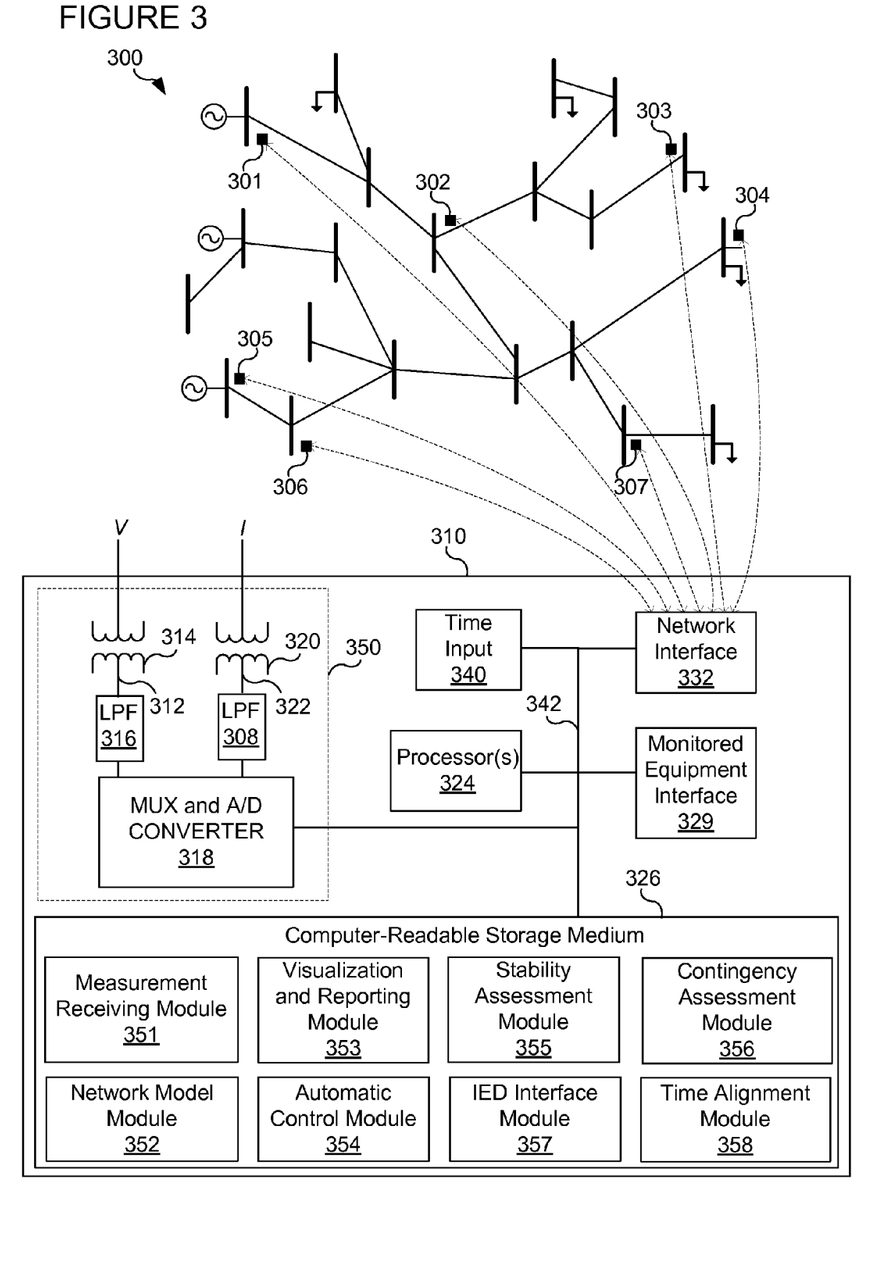
FIG. 3 illustrates one embodiment of a system for monitoring and controlling an electric power delivery system using data collected by a plurality of intelligent electronic devices in electrical communication with the electric power delivery system.

FIG. 3 illustrates an electric power delivery system 300 and a plurality of IEDs 301-307 that monitor electrical conditions and status indicators at a plurality of nodes in system 300. For example, IEDs 301-307 may be configured to gather information such as voltages, currents, breaker status, disconnect status, and the like from system 300. IEDs 301-307 are further configured to share electric power delivery system data, such as phasor data, analog signals, digitized samples, breaker status, disconnect status, and the like. IEDs 301-307 may gather information from system 300 using sensing equipment such as current transformers (CTs) (not shown), potential transformers (PTs) (not shown), and the like.

IED 310 is configured to provide a system for mitigating against voltage instability in system 300. IED 310 may include a network interface 332 configured to communicate with a data network. IEDs may also communicate with IED 310 using other communication structures such as serial communications. IED 310 also includes a time input 340, which may be used to receive a time signal and synchronize the actions of IED 310 with the actions of other connected IEDs. In certain embodiments, a common time reference may be received via network interface 332, and accordingly, a separate time input 340 would not be necessary. Various embodiments may employ any type of time reference (e.g., a time reference distributed via the IEEE 1588 protocol, IRIG, or a GPS time source). A monitored equipment interface 329 may be configured to receive status information from, and issue control instructions to, a monitored equipment. A data bus 342 may link monitored equipment interface 329, time input 340, network interface 332, and a computer-readable storage medium 326 to a processor 324.

Processor 324 may be configured to process communications received via network interface 332, time input 340, and monitored equipment interface 329. Processor 324 may operate using any number of processing rates and architectures. Processor 324 may be configured to perform various algorithms and calculations described herein. Processor 324 may be embodied as a general purpose integrated circuit, an application specific integrated circuit, a field-programmable gate array, and other programmable logic devices.

In certain embodiments, IED 310 may include a sensor component 350. In some embodiments, IED 310 may also be configured to monitor electrical characteristics of a portion of electric power delivery system 300. IEDs 301-307 may also comprise similar sensor components. In the illustrated embodiment, sensor component 350 is configured to gather data directly from a conductor (not shown) using transformers 320 and 314. Low pass filters 308 and 316, respectively, filter waveforms 322 and 312.

In other embodiments, sensor component 350 may be configured to monitor a wide range of characteristics associated with monitored equipment, including equipment status, temperature, frequency, pressure, density, infrared absorption, radio-frequency information, partial pressures, viscosity, speed, rotational velocity, mass, switch status, valve status, circuit breaker status, tap status, meter readings, and the like.

A multiplexor and/or analog-to-digital converter 318 may multiplex, sample and/or digitize the filtered waveforms to form corresponding digitized current and voltage signals. Multiplexor and/or A/D converter 318 may be connected to processor 324 by way of bus 342, through which digitized representations of current and voltage signals may be transmitted to processor 324. In various embodiments, the digitized current and voltage signals may be compared against conditions, such as those specified in one or more stability estimates.

Computer-readable storage medium 326 may be the repository of various software modules configured to perform any of the functions and methods described herein. Computer-readable storage medium 326 may be the repository of a time alignment module 358, a measurement receiving module 351, a network model module 352, a visualization and reporting module 353, an automatic control module 354, a stability assessment module 355, a contingency assessment module 356, and an IED interface module 357. Each module may perform various functions and provide one or more aspects of the functionality described herein.

Time alignment module 358 may receive a plurality of measurements from IEDs 301-307 and time align the measurements. Time alignment module 358 may receive data streams from one or more of IEDs 301-307. The data provided by IEDs 301-307 may, according to certain embodiments, be formatted according to the IEEE C37.118 protocol. In one embodiment, time alignment module 358 may also identify redundant measurements, create a measurement comprising the mean of the redundant measurements, and replace the redundant measurements with the mean of the redundant measurements. In another embodiment, the function of time alignment may be performed by a time alignment subsystem. The time alignment subsystem may comprise hardware and/or software configured to time align each measurement received from IEDs 301-307. The time stamp may be derived from a time signal received via time input 340.

In certain embodiments including sensor component 350, time alignment module 358 may also be configured to assign a time stamp to each measurement collected by the sensor component 350. The time stamp assigned to each measurement may be based on a time signal received via time input 340. In various embodiments, each of IEDs 301-307 may also comprise a time alignment module that operates similar to time alignment module 358 for assigning a time stamp each measurement recorded by each of IEDs 301-307. In still other embodiments, each of IEDs 301-307 may comprise a time alignment subsystem comprising software and/or hardware resources to assign a time stamp to each measurement.

Measurement receiving module 351 may be configured to receive a plurality of measurements representing electrical conditions in an electric power delivery system and a plurality of status indicators indicating the status of various devices in the electric power delivery system.

Visualization and reporting module 353 may provide various visual representations of system 300, and may allow an operator to control system 300. Visualization and reporting module 353 may interface with higher level control systems, such as a SCADA system (not shown) or a wide-area situational control and awareness system (not shown). In alternative embodiments, the function of automatic control module 354 may be performed by a visualization and reporting subsystem or by a separate visualization subsystem and reporting subsystem.

Automatic control module 354 may be configured to determine one or more control actions based on one or more thresholds being satisfied and/or the identification of one or more contingencies. Automatic control module 354 may comprise a plurality of instruction sets configured to accommodate a wide variety of circumstances, which may occur during the operation of system 300. For example, automatic control module 354 may operate in conjunction with contingency assessment module 356 in order to select an instruction set comprising a plurality of execution actions to address a contingency, such as the loss of a transmission line, the loss of a generator, the addition of a load, and the like.

According to one embodiment, the function associated with each of time alignment module 358, measurement receiving module 351, network model module 352, and visualization and reporting module 353 may be provided by a real-time vector processor. One example of a real-time vector processor is model no. 3378, available from Schweitzer Engineering Laboratories, Inc. of Pullman, Wash.

Network model module 352 may be configured to simulate a plurality of scenarios, which may occur during the operation of electric power delivery system 300. Network model module 352 may be configured to predict the response of electric power delivery system 300, using a subset of the components and elements of system 300. Network model module 352 may solve power flow problems in order to identify thresholds at which system 300 exhibits voltage instability. These thresholds may then be communicated to stability assessment module 355 in order to be incorporated into an appropriate stability estimate. Network model module 352 may further coordinate with automatic control module 354, such that control actions which would affect the results of simulations generated by network model module 352 may be accounted for in such simulations.

Stability assessment module 355 may be configured to generate one or more stability estimates and to compare the one or more stability estimates to one or more stability thresholds. The stability estimates, according to various embodiments, may comprise one or more of a voltage to reactive power margin, an incremental reactive power cost index, an incremental load cost index, and a power import margin index. Stability assessment module 355 may be configured to generate stability estimates based on the plurality of measurements received from IEDs 301-307.

Contingency assessment module 356 may be configured to generate and maintain one or more contingency indexes. The contingency indexes, according to various embodiments, may comprise a plurality of contingencies and related execution actions that may be invoked upon the occurrence of a specified contingency. Contingency assessment module 356 may provide information to automatic control module 354 in order to facilitate the execution of instructions to mitigate against voltage instability in system 300. According to one embodiment, contingency assessment module 356 may include information about particular loads to be shed in order to mitigate against voltage instability in system 300.

IED interface module 357 may be configured to communicate a variety of types of information with IEDs 301-307. In various embodiments, such information may include control actions to be implemented, particular conditions to be evaluated by a remote IED, and the like. IED interface module 357 may interact with automatic control module 354 in order to carry out the execution actions selected by automatic control module 354 to mitigate against voltage instability in system 300.

Figure 4:
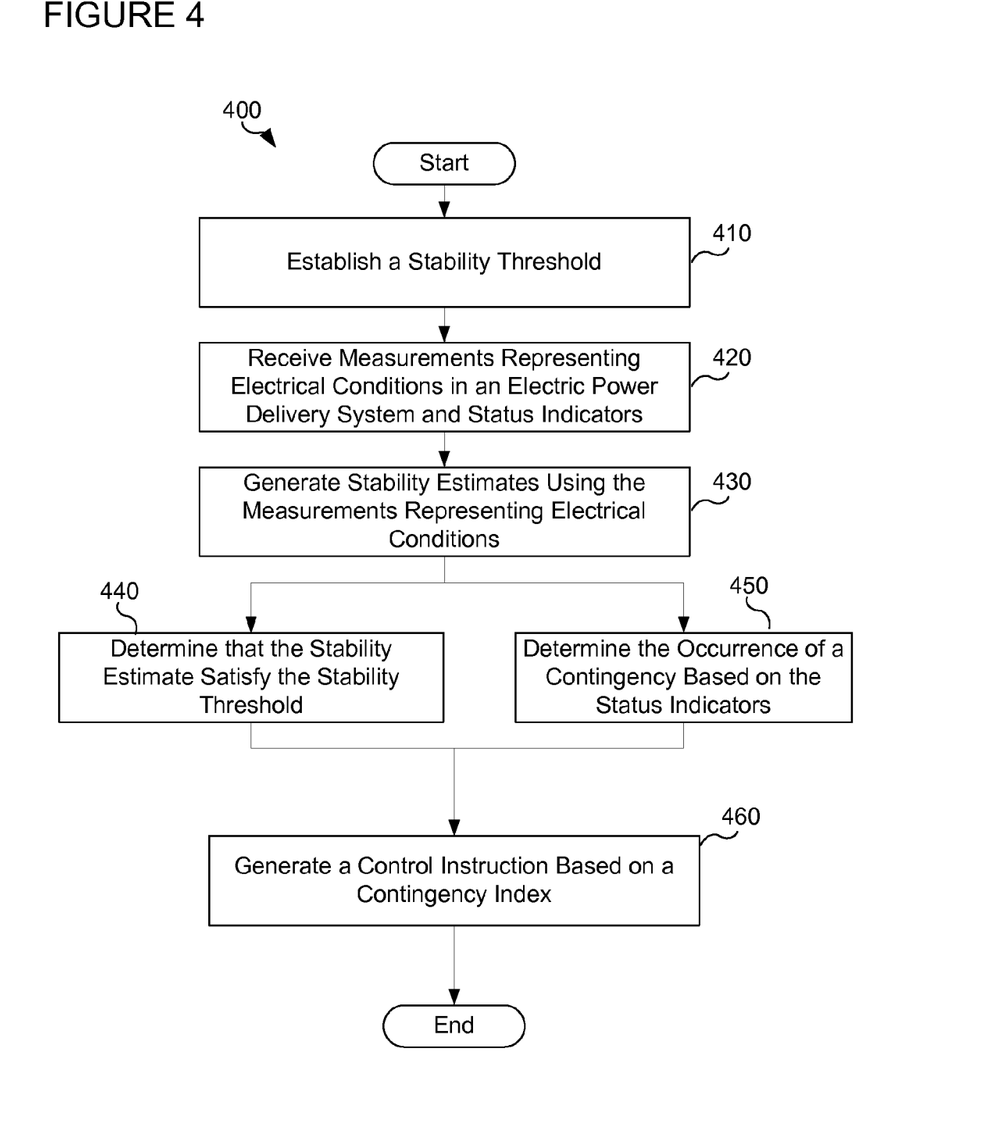
FIG. 4 illustrates one embodiment of a method for monitoring an electric power delivery system and controlling the electric power delivery system to mitigate against voltage instability.

FIG. 4 illustrates one embodiment of a method 400 for mitigating against voltage instability in an electric power delivery system. At 410, a stability threshold is established. Initially, a stability threshold may be created using simulations or may be a default value. At 420, measurements of electrical conditions and status indicators in an electric power delivery system may be received. The measurements of electrical conditions may be analyzed in order to generate stability estimates, at 430. As described in more detail herein, the stability estimates may be calculated for contingencies at various locations in the electric power delivery system using the received measurements. The stability estimates may be calculated using a simulation of the electric power delivery system. At 440, it may be determined that the stability estimates either satisfy or fail to satisfy the stability threshold. In various embodiments, the stability threshold may impose either an upper bound or a lower bound on a parameter of the electric power delivery system. The occurrence of a contingency may be determined based on the status indicators, at 450. At 460, a control action may be generated based on a contingency index in order to mitigate against voltage instability in the electric power delivery system upon occurrence of the contingency and when the stability estimate associated with that contingency satisfies the stability threshold.

Figure 5:
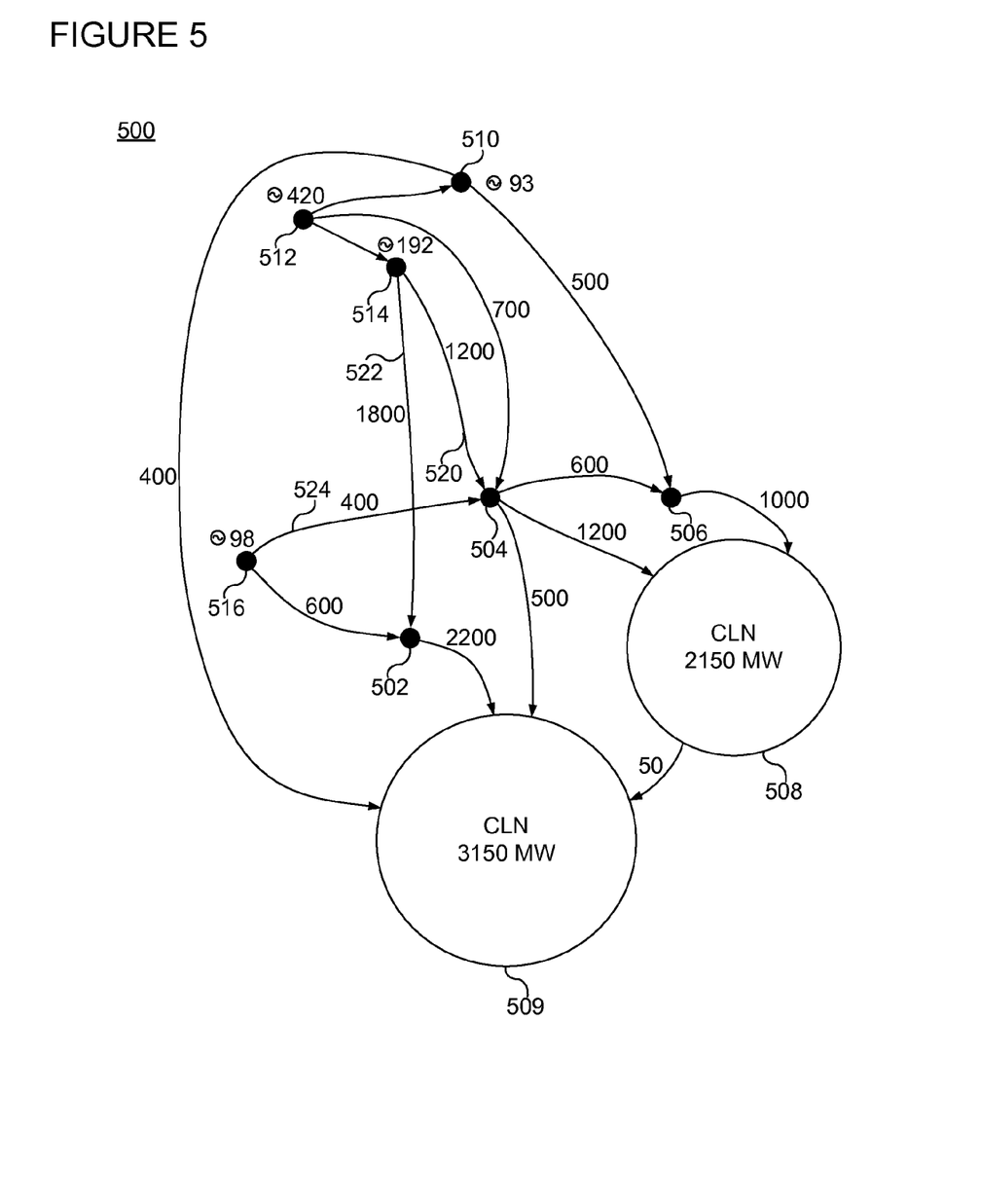
FIG. 5 illustrates a one-line diagram of an electric power delivery system that may be susceptible to voltage instability during peak-load conditions.

FIGS. 5-15 illustrate the results of a detailed simulation of an example of an electric power delivery system 500. FIG. 5 illustrates a one-line diagram of the example electric power delivery system 500. System 500 includes several substations, such as substation 502, substation 504, and substation 506. Also indicated are several generation sites 510, 512, 514, and 516, and two customer load networks (CLNs) namely, CLN 508 and CLN 509.

Initially, a base case is established for the peak load conditions of system 500. In this case, generators 510, 512, 514, and 516 are operating near their active power capacity, but sufficient reserves of reactive power are available at various points in system 500. All major transmission lines in system 500 are operating at about 50 percent of the maximum thermal capacity.

In order to examine system 500 under conditions that may lead to voltage instability, the transmission line 520 between generator 514 and substation 504 is removed in the simulation. This transmission line carried 1,200 MW before removal. Removing this transmission line forces power to flow through transmission line 522 between generator 514 and substation 502 in order to reach CLN 509. The loss of transmission line 520 also drains the reactive power reserves around CLN 508. The reactive power reserve in the static VAR compensator at CLN 509 is 40 MVAR, which causes the QV margins to approach specified stability thresholds at CLN 508.

Figure 6:
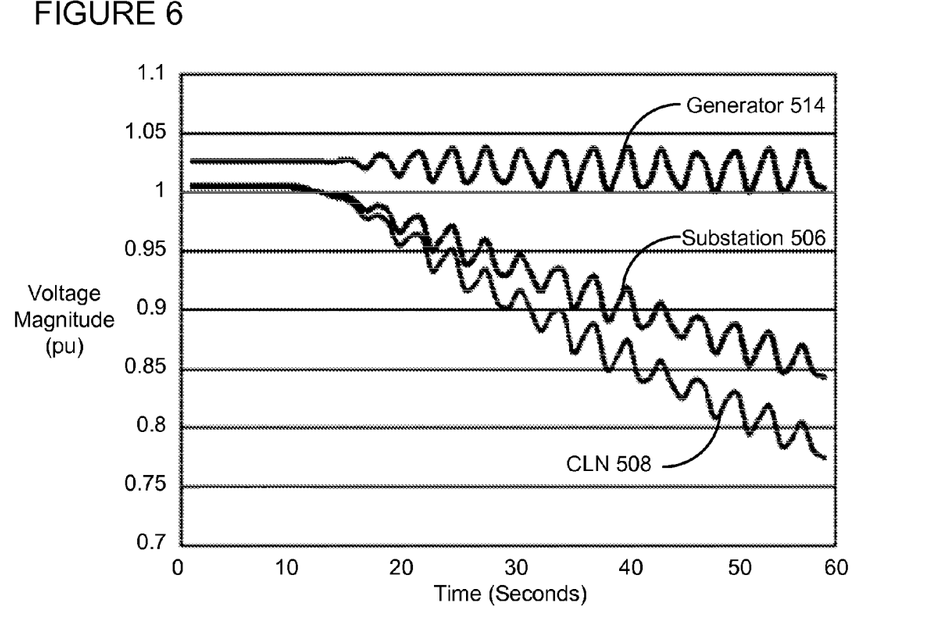
FIG. 6 illustrates simulated results of the voltage magnitude at specific locations in an electric power delivery system in response to a constantly increasing reactive power load.
Figure 7:
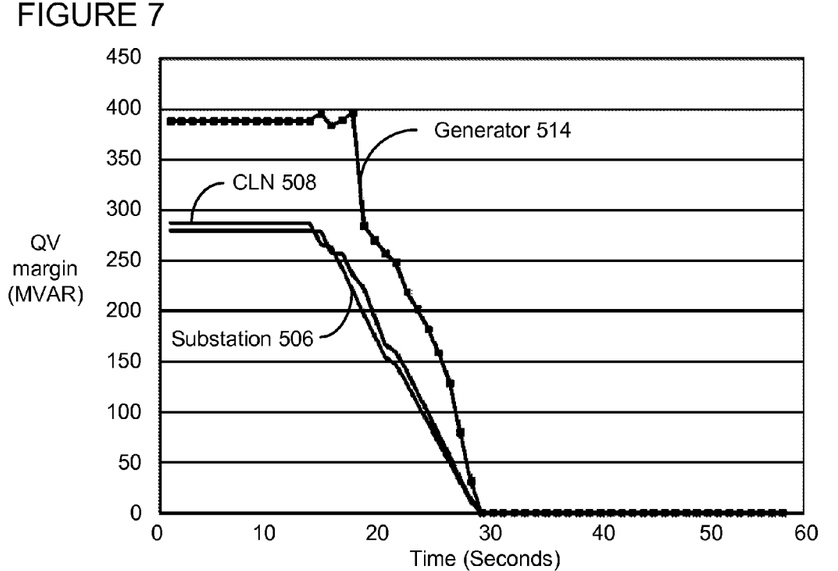
FIG. 7 illustrates simulated results of a reactive power to voltage margin at specific locations in an electric power delivery system in response to a constantly increasing reactive power load.

Using the base case described above, a dynamic simulation continually increases the reactive power at CLN 508 to force a voltage collapse. In the simulation, the reactive power load is increased at a rate of 16 MVAR/s on each bus. FIG. 6 illustrates the response of the voltage magnitudes at generator 514, substation 506, and CLN 508 in response to the constantly increasing reactive power load. FIG. 7 illustrates the QV margin each second for each bus.

Figure 8:
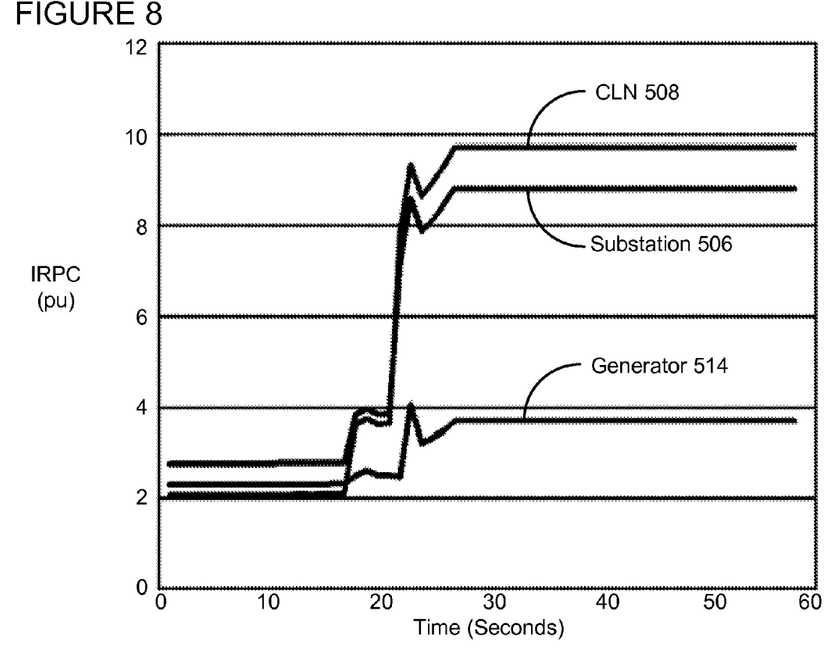
FIG. 8 illustrates simulated results of the incremental reactive power cost at specific locations in an electric power delivery system in response to a constantly increasing reactive power load.

FIG. 8 shows the IRPC values at generator 514, substation 506, and CLN 508 obtained during the simulation. From approximately 0 to 17 seconds, the IRPC values of each bus is less than 3. During this stage, the majority of additional reactive power is provided by local static VAR compensators. Between approximately 17 and 21 seconds, the IRPC values at substation 506, and CLN 508 grow to 4, which indicates that the static VAR compensator at CLN 508 is operating at its maximum capacity. After approximately 21 seconds, the static VAR compensators have reached their maximum capacity, and the IRPC value for CLN 508 and substation 506 each increase to values greater than 8.

Figure 9:
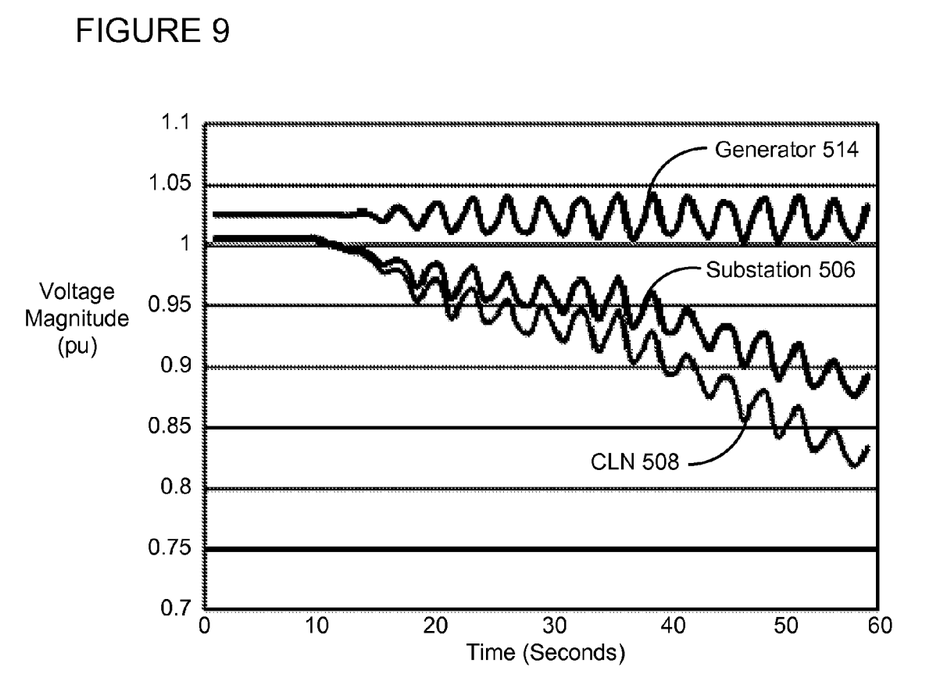
FIG. 9 illustrates simulated results of the voltage magnitude at specific locations in an electric power delivery system in response to a constantly increasing reactive power load and in response to the electric power delivery system automatically shedding loads at specified reactive power to voltage margins.
Figure 10:
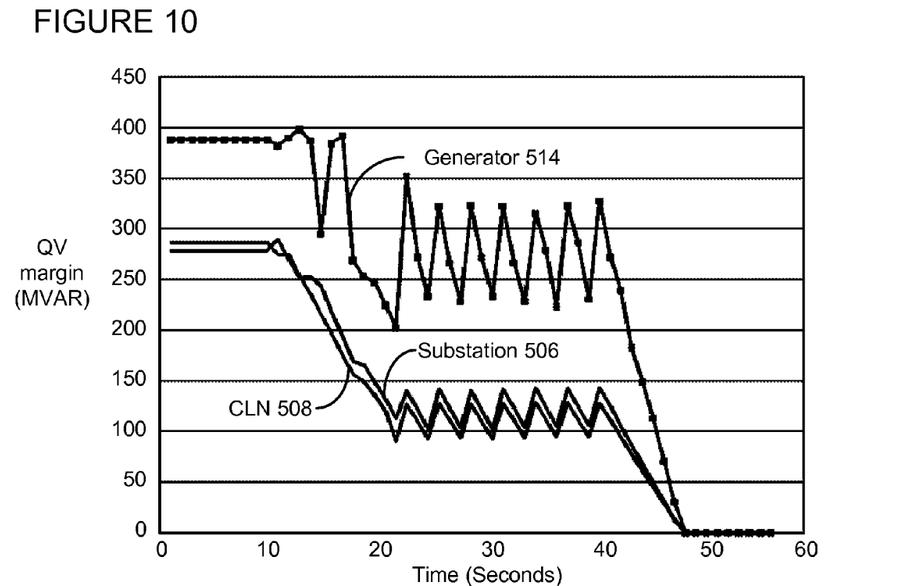
FIG. 10 illustrates simulated results of the reactive power to voltage margin at specified locations in an electric power delivery system in response to a constantly increasing reactive load and in response to the electric power delivery system automatically shedding loads at specified reactive power to voltage margins.
Figure 11:
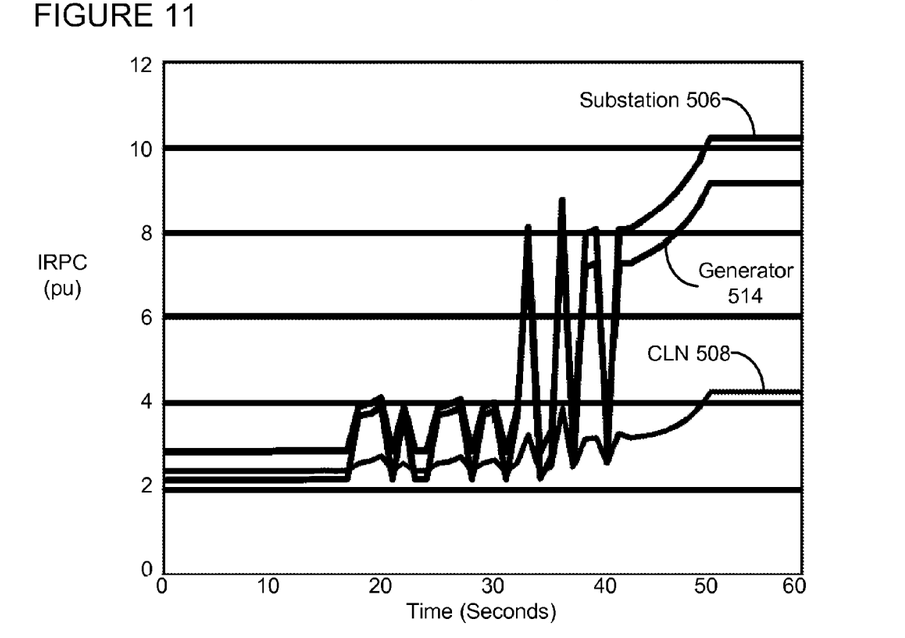
FIG. 11 illustrates simulated results of the incremental reactive power cost at specific locations in an electric power delivery system in response to a constantly increasing reactive power load and in response to the electric power delivery system automatically shedding loads at specified reactive power to voltage margins.

In the simulation illustrated in FIGS. 9-11, the stability estimates to be generated and compared to specific stability thresholds are QV margins at specified buses. Every time the QV margin drops below 100 MVAR at one of the specified buses, the system sheds load in 50 MVA blocks to restore the QV margin. FIG. 9 illustrates the behavior of the voltages at generator 514, substation 506, and CLN 508 for a constantly increasing reactive load with automatic load shedding. FIG. 10 illustrates the effect of load shedding. When the system runs out of loads to shed at approximately 40 seconds, the QV margin goes to zero MVAR, and the voltage magnitudes continue to fall, as shown in FIG. 9.

Figure 12:
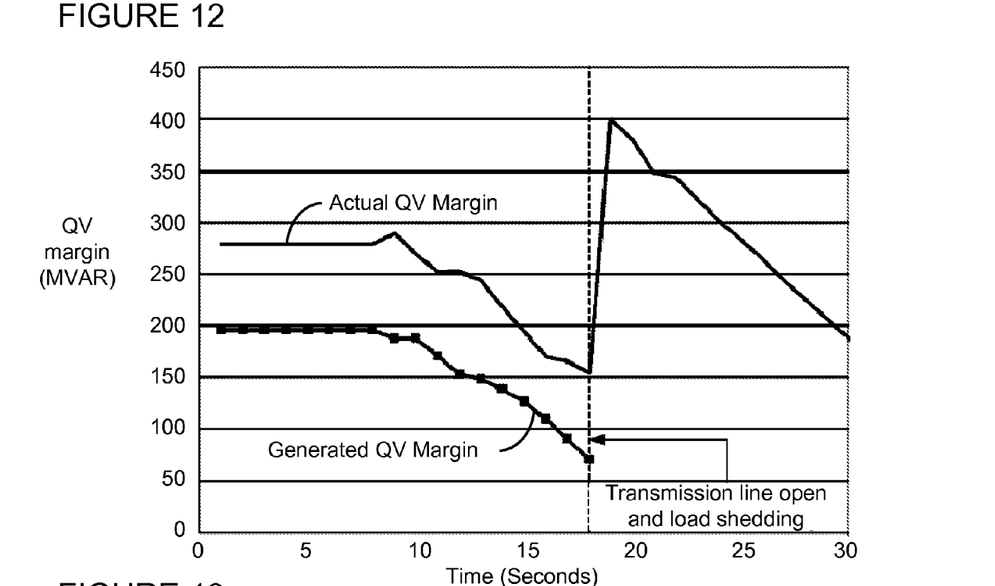
FIG. 12 illustrates simulated results of the reactive power to voltage margin at a specified location in an electric power delivery system in response to a constantly increasing reactive load and in response to the electric power delivery system automatically shedding loads at a specified reactive power to voltage margin and the occurrence of a contingency.

Comparison of FIGS. 9 and 12 shows that by automatically shedding loads, the system holds the QV margin above 100 MVAR for an additional 20 seconds. In the simulation, the reactive load grows continually and drives the QV margin to zero at approximately 50 seconds.

FIG. 11 illustrates the effect of the load shedding scheme on the IRPC values for generator 514, substation 506, and CLN 508. Comparison of FIGS. 9 and 13 shows that the IRPC value of the each bus remains below 4 for a longer period of time (i.e., approximately 16 seconds).

FIG. 12 illustrates a simulation in which the transmission line 524 between generator 516 and substation 504 is dropped. When the generated QV margin, the stability estimate in this example, falls below 100 MVAR, and the contingency occurs, the system begins shedding loads to mitigate against voltage instability.

Figure 13:
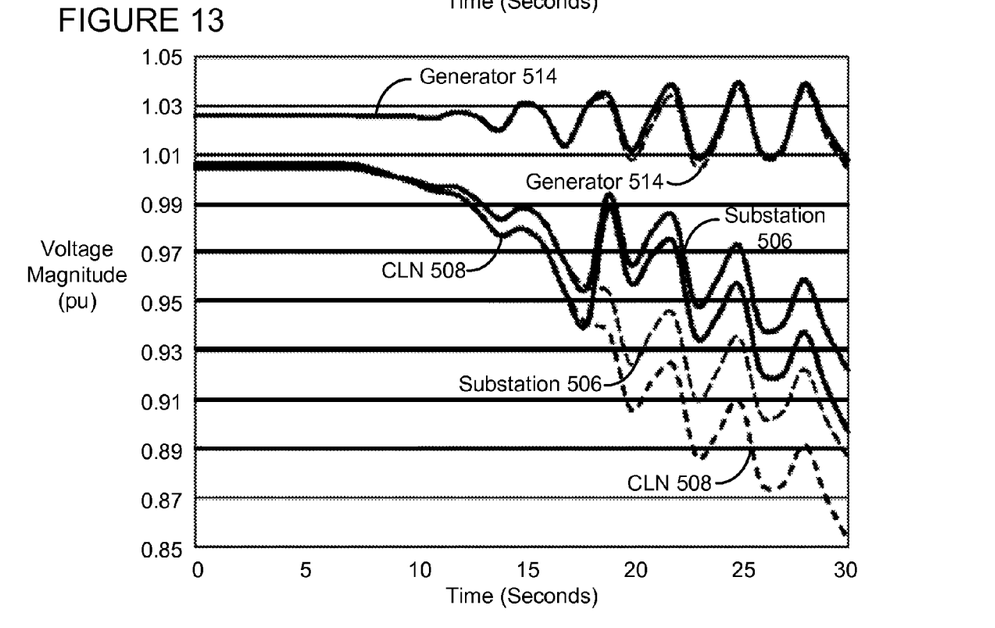
FIG. 13 illustrates simulated results of the voltage magnitude at specific locations in an electric power delivery system in response to a constantly increasing reactive power load, both with and without automatically shedding loads at a specified reactive power to voltage margin and the occurrence of a contingency.

FIG. 13 illustrates on the same graph the effect on the voltage magnitude at each of generator 514, substation 506, and CLN 508 of a simulation with load shedding based on a QV margin and without load shedding. The case without load shedding is shown using dashed lines, and the case with load shedding is shown using solid lines. In the case with load shedding, the voltages at substation 506 and CLN 508 remain above 0.93 per unit for 10 seconds longer than in the case without load shedding.

While specific embodiments and applications of the disclosure have been illustrated and described, the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method to maintain stability in an electric power delivery system, comprising:
    establishing a stability threshold;
    receiving a plurality of measurements representing electrical conditions in an electric power delivery system and a plurality of status indicators;
    generating a stability estimate based on the plurality of measurements representing electrical conditions;
    determining that the stability estimate satisfies the stability threshold;
    determining the occurrence of a contingency specified in a contingency index based on the plurality of status indicators, the contingency index comprising a plurality of contingencies and at least one control instruction correlated with each of the plurality of contingencies; and
    implementing the at least one control instruction specified by the contingency index based on the stability estimate and correlated with the contingency.

2. The method of claim 1, further comprising:
    representing the plurality of measurements as a plurality of time-synchronized vectors.

3. The method of claim 2, further comprising:
    transmitting the plurality of time-synchronized vectors to a vector processor.

4. The method of claim 3, further comprising:
    generating a packet comprising a plurality of time-synchronized vectors; and
    transmitting the packet using the IEEE C37.118 protocol to the vector processor.

5. The method of claim 1, wherein gathering a plurality of status indicators comprises one of:
    monitoring a status of a breaker;
    monitoring a tap position of a transformer;
    monitoring the status of a reactive power compensator;
    monitoring the status of a static VAR compensator; and
    monitoring the status of a capacitor bank.

6. The method of claim 1, wherein gathering the plurality of measurements representing electrical conditions comprises one of:
    monitoring a voltage; and
    monitoring a current.

7. The method of claim 1, wherein the stability estimate comprises a reactive power to voltage margin.

8. The method of claim 1, wherein the stability estimate comprises one of:

an incremental reactive power cost,
an incremental load cost, and
a power import margin.

9. The method of claim 1, wherein the contingency comprises one or more of:
a disconnection of a transmission line,
a loss of an electrical generator,
a connection of a load,
a disconnection of a transformer, and
a disconnection of a reactive power compensator.

10. The method of claim 1, wherein the control action comprises one of:
shedding a selected load,
increasing power generation, and
connecting a reactive power compensator.

11. The method of claim 1, further comprising:
identifying two redundant measurements from among the plurality of measurements representing electrical conditions;
calculating a mean value of the two redundant measurements; and
replacing the two redundant measurements with the mean value of the two redundant measurements.

12. The method of claim 1, further comprising:
updating a network model of the electric power delivery system;
simulating a plurality of scenarios using the network model, the plurality of measurements representing electrical conditions, and the plurality of status indicators; and
generating the stability estimates based on the simulation of the plurality of scenarios.

13. The method of claim 1, further comprising:
transmitting at least one of the stability threshold, the stability estimate, and the control instruction to one of a SCADA system and a wide-area situational control and awareness system.

14. The method of claim 1, further comprising:
delaying the execution of a control action by a specified time period.

15. A voltage stability system, comprising:
a measurement receiving subsystem to receive a plurality of measurements representing electrical conditions in an electric power delivery system and a plurality of status indicators;
a stability assessment subsystem to generate a stability estimate based on the plurality of measurements and to compare the stability estimate to a stability threshold to determine that the stability estimate satisfies the stability threshold;
a contingency assessment subsystem comprising a contingency index, the contingency index comprising a plurality of contingencies and at least one control instruction correlated with each of the plurality of contingencies, the contingency assessment subsystem configured to determine the occurrence of a contingency based on the plurality of status indicators; and
an automatic control subsystem to implement the at least one control action specified by the contingency index based on the stability estimate and correlated with the contingency.

16. The system of claim 15, wherein the measurement receiving subsystem further comprises:
a time-alignment subsystem to time align a plurality of time-synchronized measurements from the plurality of measurements.

17. The system of claim 16, wherein the time-alignment subsystem is configured to receive the plurality of measurements from a plurality of phasor measurement units.

18. The system of claim 16, wherein the time alignment subsystem further comprises a real-time vector processor.

19. The system of claim 15, further comprising a network model simulation subsystem to simulate a plurality of scenarios using a network model, the plurality of measurements, and the plurality of status indicators and to generate the stability estimate based on the simulation of the plurality of scenarios.

20. The system of claim 15, further comprising a timer to delay the execution of a control action by a specified time period.

21. The system of claim 15, further comprising a reporting subsystem to transmit at least one of the stability threshold, the stability estimate, and the control instruction to one of a SCADA system and a wide-area situational control and awareness system.

22. An IED, comprising:
a processor; and
a non-transitory computer-readable storage medium, comprising:
a measurement receiving module executable on the processor to receive a plurality of measurements representing electrical conditions in an electric power delivery system;
a stability assessment module executable on the processor to generate a stability estimate based on the plurality of measurements and to compare the stability estimate to a stability threshold to determine that the stability estimate satisfies the stability threshold;
a contingency assessment module executable on the processor comprising a contingency index, the contingency index comprising a plurality of contingencies and at least one control instruction correlated with each of the plurality of contingencies, the contingency assessment module configured to determine the occurrence of a contingency based on the plurality of status indicators; and
an automatic control subsystem module executable on the processor to implement the at least one control action specified by the contingency index based on the stability estimate and correlated with the contingency.

* * * * *